US010672103B2

(12) United States Patent
Energin et al.

(10) Patent No.: US 10,672,103 B2
(45) Date of Patent: *Jun. 2, 2020

(54) VIRTUAL OBJECT MOVEMENT

(71) Applicant: Microsoft Technology Licensing, LLC, Redmond, WA (US)

(72) Inventors: Semih Energin, Seattle, WA (US); Sergio Paolantonio, Bellevue, WA (US); David Evans, Bellevue, WA (US); Eric Scott Rehmeyer, Kirkland, WA (US); Robert Thomas Held, Seattle, WA (US); Maxime Ouellet, Kirkland, WA (US); Anatolie Gavriliuc, Kirkland, WA (US); Riccardo Giraldi, Seattle, WA (US); Andrew Frederick Muehlhausen, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/426,740

(22) Filed: May 30, 2019

(65) Prior Publication Data
US 2019/0279335 A1    Sep. 12, 2019

Related U.S. Application Data

(63) Continuation of application No. 15/336,461, filed on Oct. 27, 2016, now Pat. No. 10,311,543.

(51) Int. Cl.
*G06T 3/20* (2006.01)
*G06F 3/0481* (2013.01)
(Continued)

(52) U.S. Cl.
CPC .............. *G06T 3/20* (2013.01); *A63F 13/428* (2014.09); *A63F 13/53* (2014.09); *G06F 1/163* (2013.01);
(Continued)

(58) Field of Classification Search
CPC .......... G06T 3/20; G06T 3/60; G06T 19/006; G06T 19/20; G06T 2210/21; G06T 2219/2004; G06T 2219/2016; A63F 13/428; A63F 13/53; G06F 1/163; G06F 3/011; G06F 3/012; G06F 3/013; G06F 3/017; G06F 3/0304; G06F 3/04815; G06F 3/04845
See application file for complete search history.

(56) References Cited

U.S. PATENT DOCUMENTS

| 10,311,543 | B2* | 6/2019 | Energin | ............... G06F 3/04845 |
| 2005/0062738 | A1* | 3/2005 | Handley | .................. G06F 3/016 345/419 |
| 2013/0286004 | A1* | 10/2013 | McCulloch | ........... G06T 19/006 345/419 |

* cited by examiner

*Primary Examiner* — Chong Wu
(74) *Attorney, Agent, or Firm* — Alleman Hall Creasman & Tuttle LLP

(57) ABSTRACT

A method for moving a virtual object includes displaying a virtual object and moving the virtual object based on a user input. Based on the user input attempting to move the virtual object in violation of an obstacle, displaying a collision indicator and an input indicator. The collision indicator is moved based on user input and movement constraints imposed by the obstacle. The input indicator is moved based on user input without movement constraints imposed by the obstacle.

20 Claims, 9 Drawing Sheets

(51) Int. Cl.
*G06T 19/20* (2011.01)
*A63F 13/428* (2014.01)
*A63F 13/53* (2014.01)
*G06F 1/16* (2006.01)
*G06F 3/01* (2006.01)
*G06F 3/03* (2006.01)
*G06F 3/0484* (2013.01)
*G06T 3/60* (2006.01)
*G06T 19/00* (2011.01)

(52) U.S. Cl.
CPC .............. *G06F 3/011* (2013.01); *G06F 3/012* (2013.01); *G06F 3/013* (2013.01); *G06F 3/017* (2013.01); *G06F 3/0304* (2013.01); *G06F 3/04815* (2013.01); *G06F 3/04845* (2013.01); *G06T 3/60* (2013.01); *G06T 19/006* (2013.01); *G06T 19/20* (2013.01); *G06T 2210/21* (2013.01); *G06T 2219/2004* (2013.01); *G06T 2219/2016* (2013.01)

VIRTUAL OBJECT MOVEMENT

CROSS REFERENCE TO RELATED APPLICATIONS

This application is a continuation of U.S. patent application Ser. No. 15/336,461, filed Oct. 27, 2016, the entire contents of which is hereby incorporated herein by reference for all purposes.

BACKGROUND

Head mounted display devices (HMDs) can be used to provide augmented reality (AR) experiences and/or virtual reality (VR) experiences by presenting virtual imagery to a user. The virtual imagery may be manipulated by the user and/or otherwise interacted with based on user input.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for moving a virtual object includes displaying a virtual object and moving the virtual object based on a user input. Based on the user input attempting to move the virtual object in violation of an obstacle, displaying a collision indicator and an input indicator. The collision indicator is moved based on user input and movement constraints imposed by the obstacle. The input indicator is moved based on user input without movement constraints imposed by the obstacle.

DETAILED DESCRIPTION

A virtual or augmented reality computing device may present virtual objects to a user, and permit the user to freely move the virtual objects through three-dimensional space. However, such movement may bring a virtual object toward a virtual or real world obstacle (e.g., a real world object in a physical environment, such as a real wall or real table, or another virtual object). In some scenarios, after reaching the obstacle, the user may expect the virtual object he or she is moving to behave as a tangible object from the real world and collide with the obstacle. However, in other scenarios, the user may intend for the virtual object to pass through the obstacle as though the obstacle were not present. Given this ambiguity, it can be difficult to provide a user experience that allows a user to freely move a virtual object in a predictable and satisfying manner.

Accordingly, the present disclosure is directed to an approach for moving a virtual object when movement of the virtual object conflicts with movement constraints of an obstacle. In particular, when a movement constraint of an obstacle is violated (e.g., a user attempts to move a virtual object through another object), an input indicator that tracks input without constraint is displayed along with a collision indicator that respects movement constraints. Such an approach allows a user to carefully and intuitively move a virtual object to a desired location, regardless of whether the user intends for the object to respect constraints imposed by an obstacle.

Figure 1A:
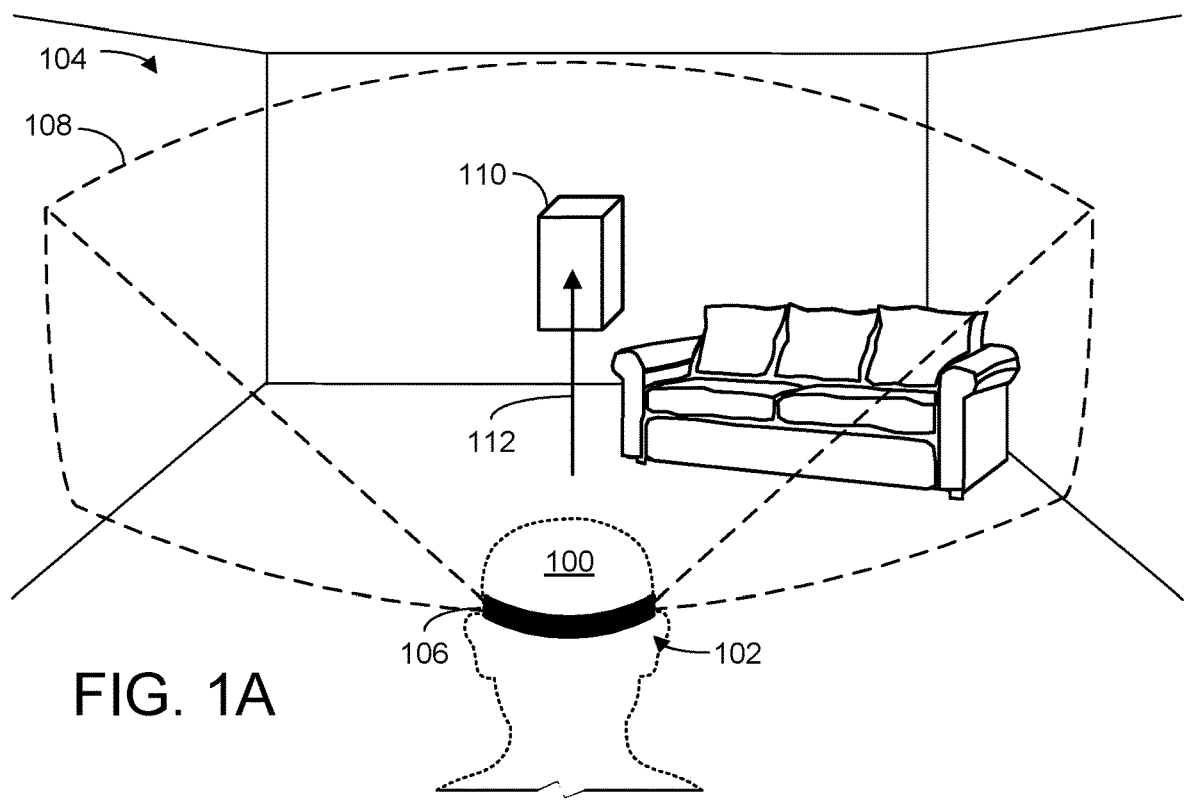
FIGS. 1A and 1B schematically show a user moving a virtual object displayed by a virtual reality computing device through an environment.

FIG. 1A schematically shows a user 100 wearing a virtual reality computing device 102 and viewing a surrounding environment 104. Virtual reality computing device 102 includes one or more near-eye displays 106 configured to present virtual imagery to eyes of the user, as will be described below. FIG. 1A also shows a field of view (FOV) 108 of the user, indicating the area of environment 104 visible to user 100 from the illustrated vantage point.

Though the term "virtual reality computing device" is generally used herein to describe a head mounted display device (HMD) including one or more near-eye displays, devices having other form factors may instead be used to view and manipulate virtual imagery. For example, virtual imagery may be presented and manipulated via a smartphone or tablet computer facilitating an augmented reality experience, and/or other suitable computing devices may instead be used.

Virtual reality computing device 102 may be an augmented reality computing device that allows user 100 to directly view a real world environment through a partially transparent near-eye display, or virtual reality computing device 102 may be fully opaque and either present imagery of a real world environment as captured by a front-facing camera, or present a fully virtual surrounding environment. To avoid repetition, experiences provided by both implementations are referred to as "virtual reality" and the computing devices used to provide the augmented or purely virtualized experiences are referred to as virtual reality computing devices. Further, it will be appreciated that regardless of whether a virtual or augmented reality experience is implemented, FIGS. 1A and 1B show at least some virtual imagery that is only visible to a user of a virtual reality computing device.

Also shown in FIG. 1A is a virtual object 110. As described above, a user of a virtual reality computing device may move a virtual object through three-dimensional space. This is shown in FIG. 1A, in which virtual object 110 has moved away from user 100 in the direction of arrow 112. The virtual object 110 moves responsive to a user input provided by the user. In the drawings, arrows such as arrow 112 are used to indicate user input. Such user input may be performed in a variety of ways, via a variety of different input methods supported by the virtual reality computing device. For example, the user may provide a gestural input captured by one or more cameras and/or motion sensors, and/or a vocal command captured by a microphone. Additionally, or alternatively, the user may make use of one or more input interfaces, such as a computer mouse, trackpad, joystick, video game controller, touch screen interface, etc., as well as any other input interfaces suitable for manipulating virtual objects. Such an input interface may be a part of the virtual reality computing device 102, or the input interface may be part of an external device (e.g., smart phone or dedicated input device).

Figure 1B:
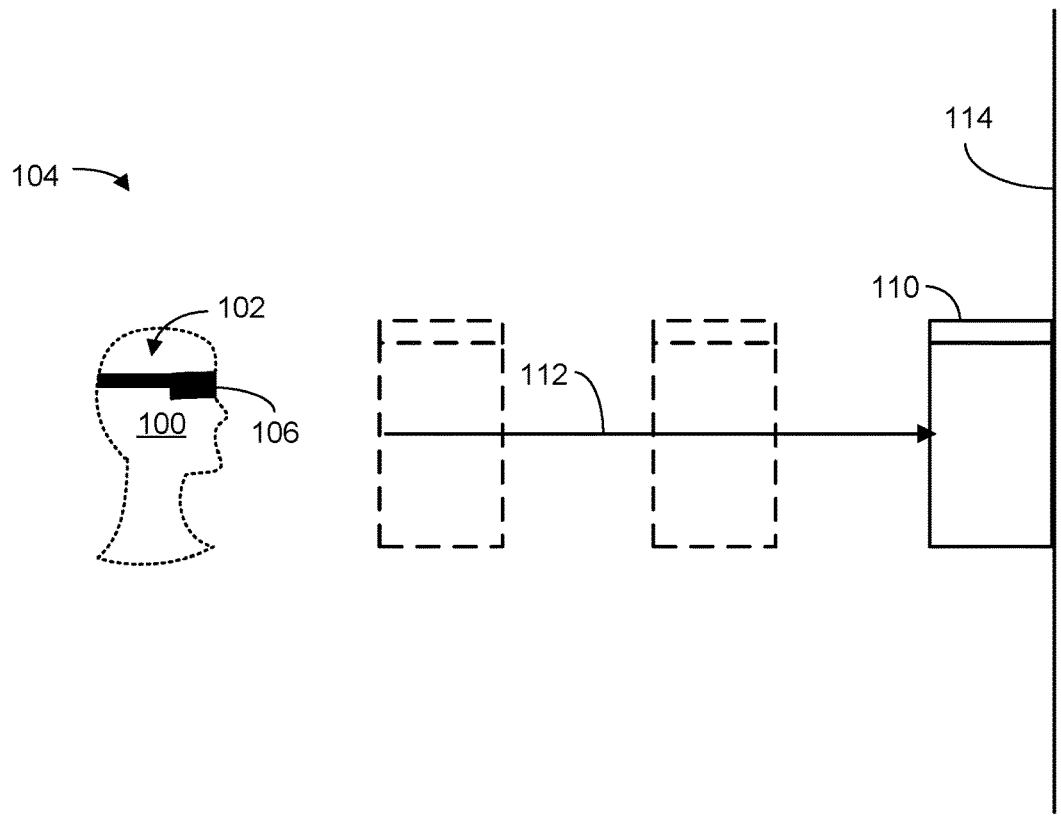

FIG. 1B shows an alternate view of the movement of virtual object 110. As shown, virtual object 110 has moved through surrounding environment 104 away from user 100 in the direction of arrow 112. Dashed outlines of the virtual object indicate previous locations occupied by the virtual object during the movement. While virtual object 110 is only illustrated as moving in a single direction—away from the user—a virtual reality computing device may be configured to move a virtual object freely throughout three-dimensional space responsive to user input. In other words, movement of the virtual object may have at least three degrees of freedom (3 DOF). Further, a virtual reality computing device may be configured to change one or more of a pitch, roll, and/or yaw of a virtual object based on user input, for a total of six degrees of freedom (6 DOF).

Movement of a virtual object as described herein is generally referred to as being caused by user input or performed by a virtual reality computing device based on receiving user input. However, a virtual reality computing device may move virtual objects for a variety of reasons that do not involve explicit user input provided by a user. For example, virtual objects may be moved according to predetermined patterns, dynamically moved according to software instructions (e.g., artificial intelligence), etc. It will be appreciated that this disclosure applies in scenarios where movement of the virtual objects is or is not caused by explicit user input.

As shown, the user input indicated by arrow 112 is attempting to move virtual object 110 in violation of obstacle 114, which may take the form of either a real world object (e.g., a wall, screen, piece of furniture), or a virtual object rendered by the virtual reality computing device. Movement of virtual object 110 may be restricted by movement constraints of the obstacle. In other words, user 100 may be unable to move virtual object 110 beyond obstacle 114. In some cases, user 100 may expect the virtual object to behave as a tangible real world object, and such movement restriction may be desirable. However, in other cases, the user may expect the virtual object to pass through the obstacle, or for the movement of the virtual object to be relatively unaffected by presence of the obstacle. Accordingly, based on user input attempting to move a virtual object in violation of an obstacle, a virtual reality computing device may replace the virtual object with a collision indicator and an input indicator, as will be described below.

Figure 2:
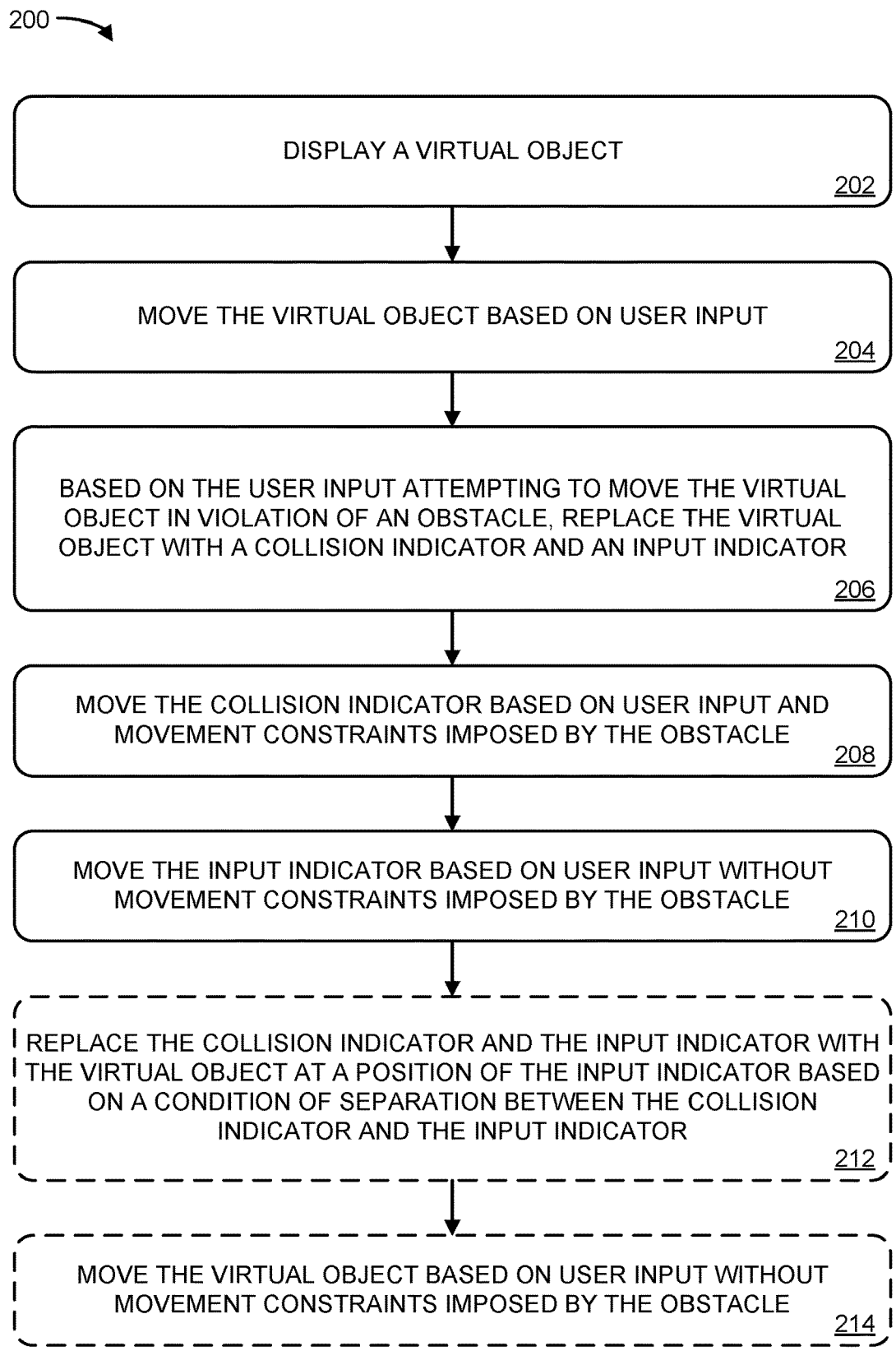
FIG. 2 illustrates an example method for moving a virtual object.

FIG. 2 illustrates an example method 200 for moving a virtual object, such as virtual object 110. At 202, method 200 includes displaying a virtual object. A virtual object may have virtually any size, shape, or appearance, and may be displayed via a display of a virtual reality computing device, such as device virtual reality computing 102.

At 204, method 200 includes moving the virtual object based on user input. This may be done as described above with respect to FIGS. 1A and 1B. A virtual reality computing device may be configured to interpret user input taking a variety of forms. Further, a virtual object may be moved, rotated, translated, or otherwise manipulated in any suitable manner.

Figure 3A:
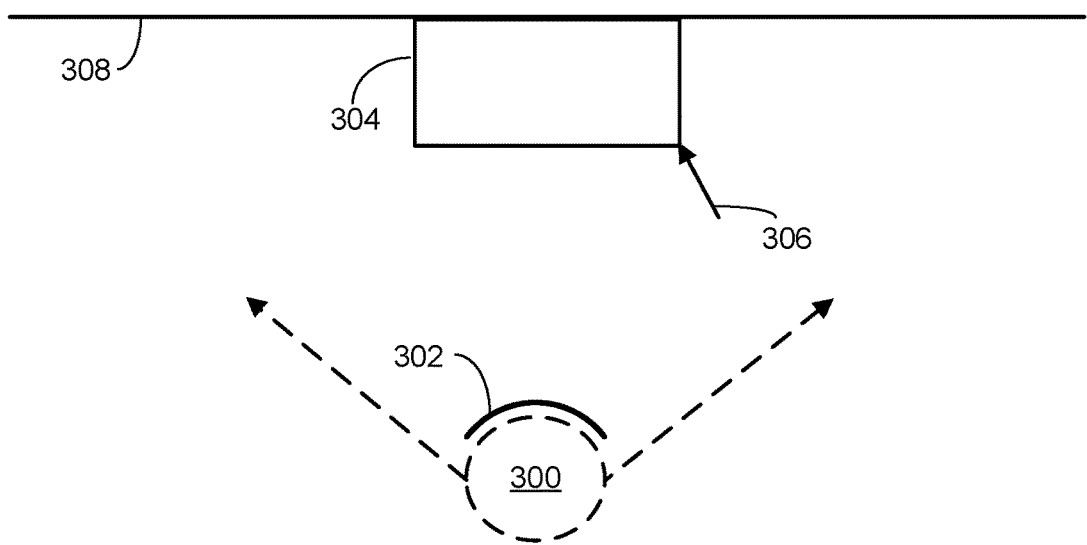
FIGS. 3A and 3B schematically illustrate replacing a virtual object with a collision indicator and an input indicator.
Figure 3B:
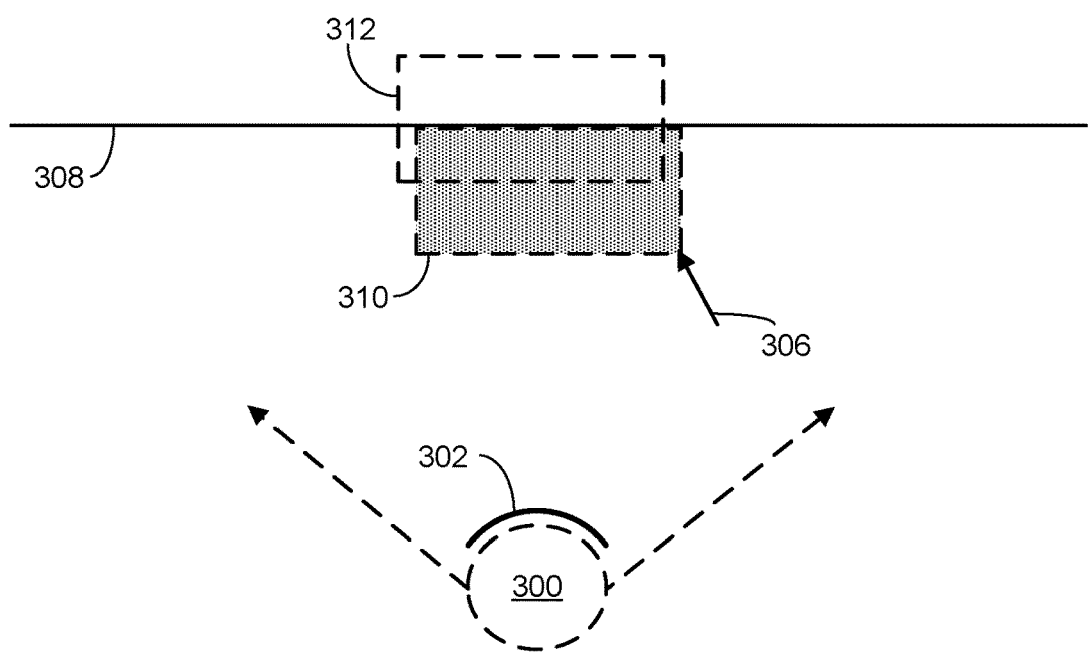

At 206, method 200 includes, based on the user input attempting to move the virtual object in violation of an obstacle, replacing the virtual object with a collision indicator and an input indicator. This is illustrated in FIGS. 3A and 3B. FIG. 3A schematically shows a user 300 using a virtual reality computing device 302 to view a virtual object 304. Arrow 306 indicates a user input performed by user 300, and the user input is attempting to move the virtual object in violation of an obstacle 308. Accordingly, the virtual reality computing device may replace the virtual object 304 with a collision indicator 310 and an input indicator 312, shown in FIG. 3B. As will be described below, movement of the collision indicator may be restricted by movement constraints imposed by the obstacle. However, movement of the input indicator may not be constrained by the obstacle, and instead may continue to move unconstrained based on user input. As such, the input indicator provides the user visual feedback as to the user input, while the collision indicator maintains a sense of realism in which collisions are respected. As used herein, replacing the virtual object with the collision indicator and the input indicator may include adding a collision indicator and treating the virtual object as an input indicator; adding an input indicator and treating the virtual object as a collision indicator; and removing the virtual object and adding an input indicator and a collision indicator.

In FIG. 3B, collision indicator 310 and input indicator 312 are shown as having an appearance that is similar to though distinct from virtual object 304. However, in some implementations, an appearance of the collision indicator may mimic an appearance of the virtual object. In other words, the collision indicator and the virtual object may be substantially identical, such that the user does not perceive a difference between the two. In other implementations, an appearance of the collision indicator may differ from an appearance of the virtual object in one or more ways (e.g., different colors, different transparency, different size, different shape).

The appearance of the input indicator may match the appearance of the virtual object. In some implementations the appearance of the input indicator may have an appearance that is different than but derived from an appearance of the virtual objet. For example, an appearance of the input indicator may differ from the appearance of the virtual object according to one or more of color, size, and transparency, as well as other visual properties. In other implementations, the appearance of the input indicator is not derived from an appearance of the virtual object. As an example, the input indicator may be a generic pointer.

In some implementations, the collision indicator may have an appearance that matches that of the virtual object, while the input indicator has a different color, size, transparency, etc. Further, a difference in appearance between the collision indicator and input indicator may change based on a distance between the collision indicator and the input indicator. For example, as the user moves the input indicator further away from the collision indicator, the appearance of the input indicator may change to be less similar to the collision indicator. In general, collision and input indicators as described herein may have virtually any size, shape, color, and overall appearance.

Figure 4:
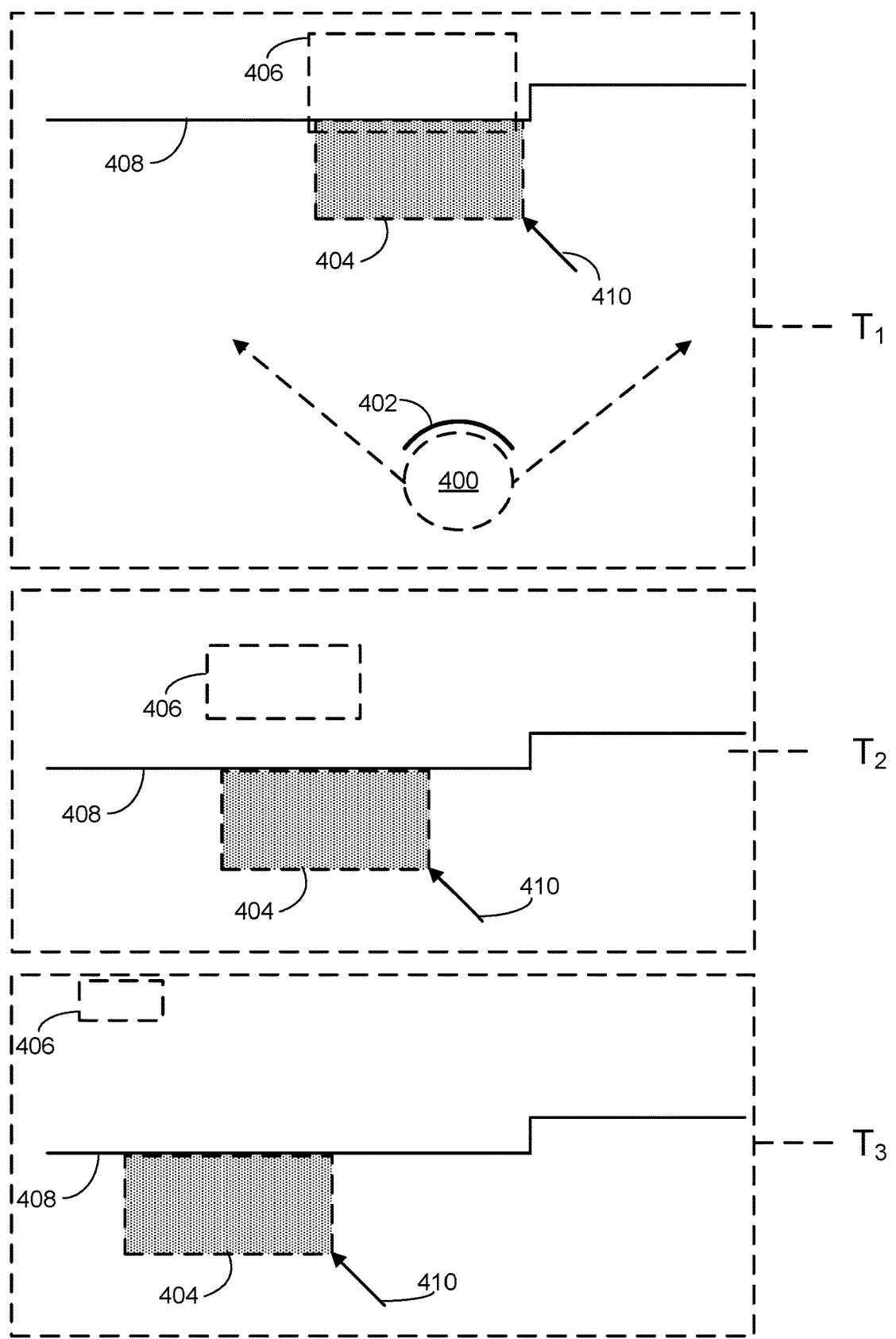
FIGS. 4 and 5 schematically illustrate movement of collision and input indicators.

Returning to FIG. 2, at 208, method 200 includes moving the collision indicator based on user input and movement constraints imposed by the obstacle. At 210, method 200 includes moving the input indicator based on user input without movement constraints imposed by the obstacle. This is schematically illustrated in FIG. 4. At time $T_1$, FIG. 4 shows a user 400 viewing an environment via a virtual reality computing device 402 after a virtual object has been replaced by a collision indicator 404 and an input indicator 406. Collision indicator 404 is adjacent to an obstacle 408, while input indicator 406 has mostly passed through the obstacle. The virtual object was replaced by the collision and input indicators based on the user attempting to push the virtual object through the obstacle. As shown, input indicator 406 has continued to move in a direction of the user input shown by arrow 410, while movement of collision indicator 404 is constrained by obstacle 408. As indicated above, the user may choose to move a virtual object, and therefore the collision and input indicators, in a variety of suitable ways, though movement of the collision indicator may be restricted by movement constraints of the obstacle. For example, rotation of the input indicator may result in collision-permissible rotation of the input indicator.

Further movement of the input and collision indicators is shown at times $T_2$ and $T_3$ of FIG. 4. Specifically, at $T_2$, input indicator 406 has moved away from collision indicator 404 and obstacle 408 in the direction of the user input shown by arrow 410, without regard to movement constraints of obstacle 408. Collision indicator 404 was not able to move in a direction perpendicular to obstacle 408, as it is restricted by movement constraints of obstacle 408. However, collision indicator 404 has moved in a direction parallel to obstacle 408, in accordance with a directional component of the user input that is parallel with obstacle 408 and does not violate movement constraints of obstacle 408. Continuing movements of the input and collision indicators are shown at $T_3$ of FIG. 4, in which the input indicator has moved further away from obstacle 408 without regard to movement constraints, while movement of collision indicator 404 is still restricted by the obstacle.

As indicated above, a difference in appearance between an input indicator and a collision indicator optionally may depend on a distance between the two indicators. This is shown in FIG. 4, in which the input indicator 406 decreases in size as it moves further from the collision indicator.

An obstacle may constrain the movement of a collision indicator in a number of ways. In some implementations, movement constraints imposed by an obstacle may prevent the collision indicator from passing through the obstacle, or sharing three-dimensional space with the obstacle. Alternatively, movement constraints may prevent the object from occupying space within a threshold distance of the obstacle. Similarly, movement constraints may permit the collision indicator to move past the obstacle to a minor degree, though not fully bypass the obstacle. The particular constraints discussed herein are not limiting, and method 200 is compatible with virtually any type of movement constraint.

Figure 5:
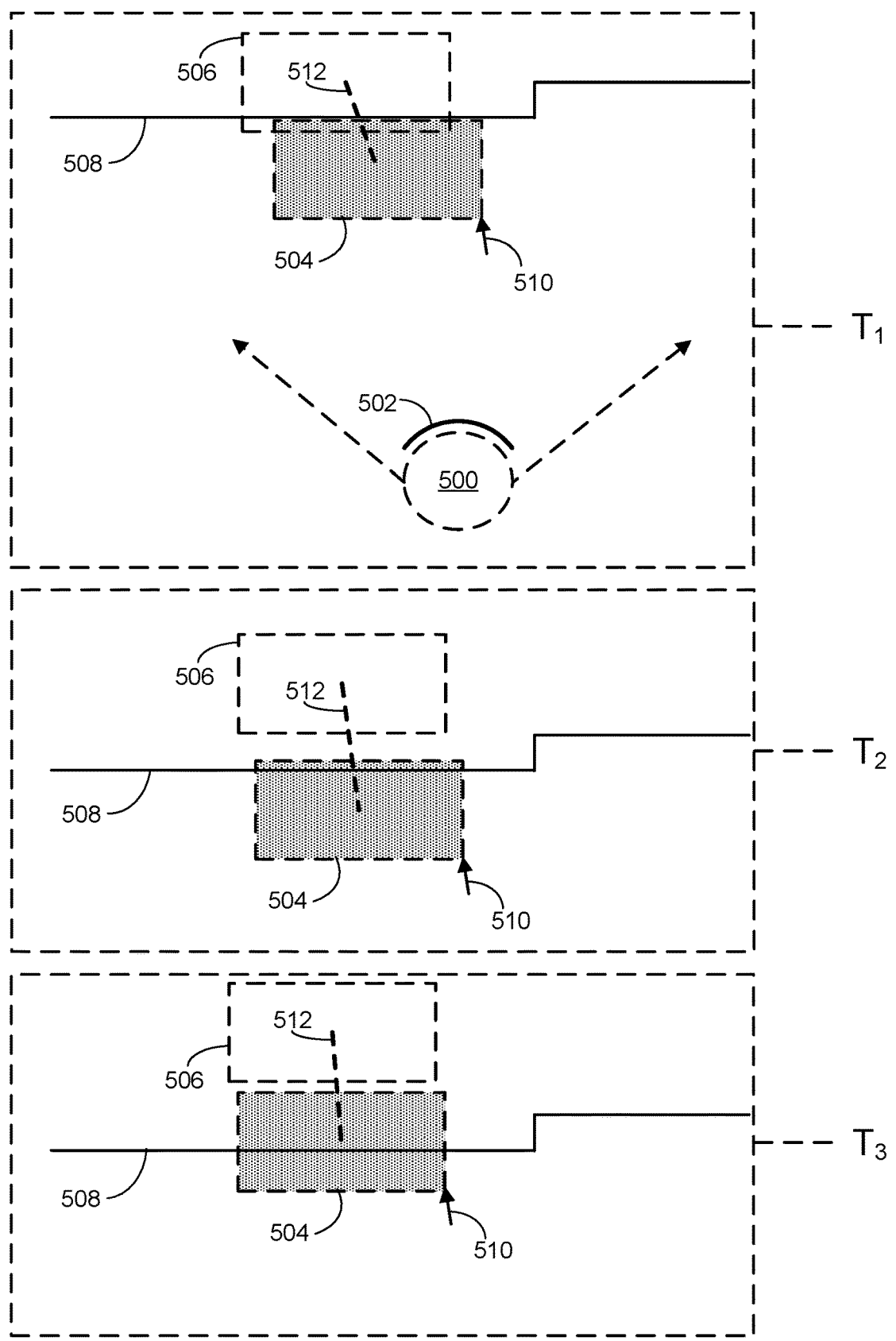

In some implementations, movement constraints imposed on a collision indicator may be relaxed under certain circumstances. For example, such constrains may be relaxed as a distance between the collision indicator and the input indicator increases. This is schematically shown in FIG. 5. At time $T_1$, FIG. 5 shows a user 500 viewing an environment via a virtual reality computing device 502 after user input attempted to push a virtual object through obstacle 508. As such, the virtual object has been replaced by a collision indicator 504 and an input indicator 506. As shown, movement constraints imposed by an obstacle 508 are affecting the ability of the collision indicator to move in the direction of input arrow 510. Meanwhile, input indicator 506 is moving in the direction of arrow 510 without regard to movement constraints of obstacle 508.

Further movement of the input and collision indicators is shown at times $T_2$ and $T_3$ of FIG. 5. At $T_2$, input indicator 506 has continued to move in the direction of the user input, without regard to obstacle 508. Meanwhile, though movement constraints imposed by the obstacle are still preventing the collision indicator from passing the obstacle and joining the input indicator, these constraints have been partially relaxed as the distance between the collision and input indicators has increased. Accordingly, a portion of collision indicator 504 has bypassed the obstacle. This may indicate to the user that further movement of the input indicator will fully overcome the movement constraints. Continuing movements of the input and collision indicators are shown at $T_3$ of FIG. 5, where the distance between the input and collision indicators has increased. Accordingly, movement constraints of obstacle 508 have been further relaxed, allowing a greater portion of collision indicator 504 to bypass the obstacle.

Further, in some implementations, movement constraints imposed by an obstacle may be affected by factors other than a distance between the collision and input indicators. For example, movement constraints may be gradually relaxed as a collision indicator contacts an obstacle, movement constraints may be applied to collision indicators representing certain types of virtual objects differently from collision indicators representing other types of virtual objects, etc.

Movement of a collision indicator optionally may be at least partially based on a simulated attractive force that pulls the collision indicator toward the input indicator. This is indicated in FIG. 5 by dashed line 512, which represents a force that pulls collision indicator 504 toward input indicator 506. This may cause the collision indicator to move in a manner that is influenced by movement of the input indicator. In other words, as the input indicator moves, the collision indicator may move so as to remain as close as possible to the input indicator, while still respecting any full or relaxed movement constraints imposed by an obstacle. Alternatively, the collision indicator may not move with the input indicator, and may instead occupy a fixed position relative to the obstacle as the input indicator moves.

Figure 6A:
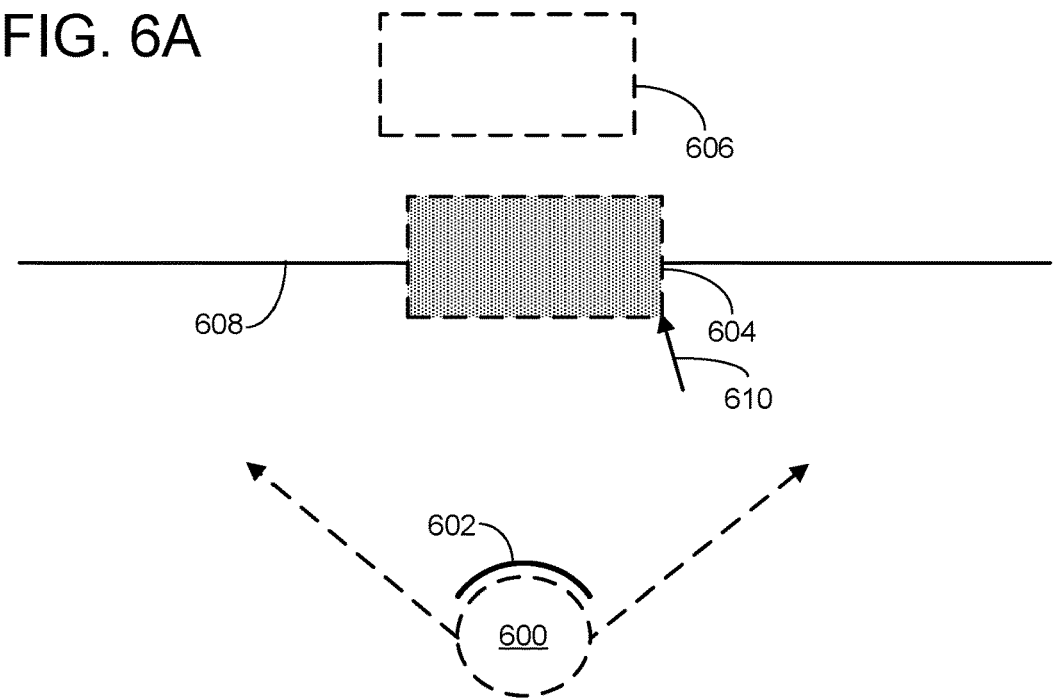
FIGS. 6A and 6B illustrate replacing a collision indicator and an input indicator with a virtual object.

Returning to FIG. 2, at 212, method 200 optionally includes replacing the collision indicator and the input indicator with the virtual object at a position of the input indicator based on a condition of separation between the collision indicator and the input indicator. This is schematically shown in FIG. 6A, which shows a user 600 using a virtual reality computing device 602 to view a collision indicator 604 as well as an input indicator 606, which are shown on opposite sides of an obstacle 608. As shown, user 600 is providing a user input to move the collision and input indicators in the direction of arrow 610, resulting in movement of the input indicator away from the collision indicator to the position at which it is shown in FIG. 6A. However, movement constraints imposed by obstacle 608 on collision indicator 604 are preventing the collision indicator from passing the obstacle and moving in the direction of the user input.

Figure 6B:
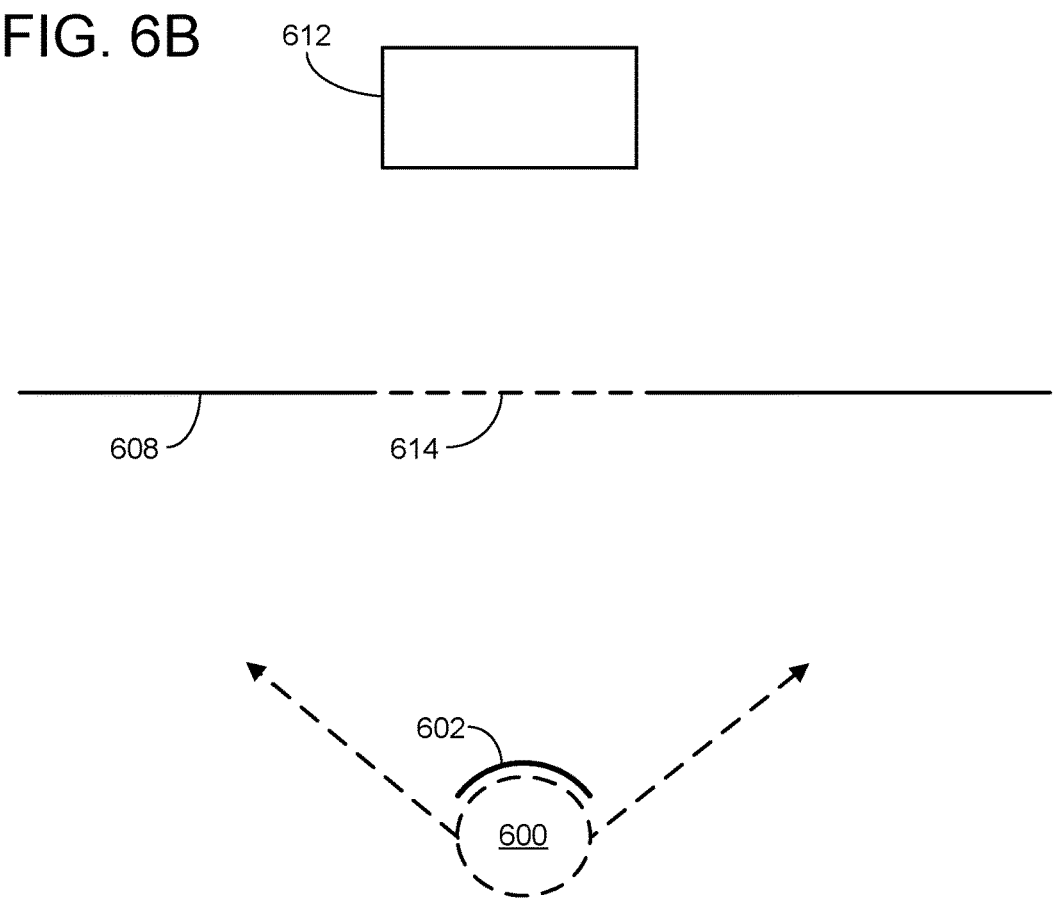

Based on a condition of separation between the collision indicator and the input indicator, these indicators may be replaced by a virtual object at a position of the input indicator. In some implementations, the condition of separation may be a distance between the collision indicator and the input indicator, and these indicators may be replaced by the virtual object based on the distance exceeding a threshold. This is shown in FIG. 6B, in which virtual object 612 has replaced collision indicator 604 and input indicator 606 at a former position of input indicator 606. It will be appreciated that any suitable distance threshold may be used to trigger when the indicators are replaced by the virtual object, and this threshold may depend on the type of virtual object, the type of obstacle, a time elapsed since the virtual object was replaced by the input and collision indicators, etc. Such a threshold can be set to virtually any magnitude, with shorter threshold distances making it easier to overcome movement constraints and longer threshold distances making it easier to more accurately place a virtual object in a specific location against an obstacle. Further, as described above, as the distance between the collision and input indicators increases, movement constraints of the obstacle may be relaxed. This may allow the collision indicator to begin to gradually pass through the obstacle, serving as a visual indicator to the user that further movement of the input indicator will push the virtual object through the obstacle. As used herein, replacing collision and input indicators with a virtual object may refer to removing an input indicator and treating the collision indicator as the virtual object; removing the collision indicator and treating the input indicator as the virtual object; and removing both the collision and input indicators and adding the virtual object at a position of either the collision or input indicators.

In some implementations, a virtual reality computing device may provide auditory and/or haptic feedback to a user based on virtual object collisions and/or state changes. For example, the virtual reality computing device may generate an audible "bump" sound when a virtual object comes into contact with an obstacle. Similar sound effects may be generated when the virtual object is replaced by the collision and input indicators, as the user continues to provide user input in violation of the obstacle, as movement constraints of an obstacle are relaxed, when the input and collision indicators are replaced by the virtual object, etc. Similarly, in scenarios where the user is controlling virtual object movement with one or more physical input devices, such input devices may provide vibrations or other haptic feedback in addition to or instead of sound effects as described above.

Upon the virtual object replacing the collision and input indicators at the position of the input indicator, movement constraints of the obstacle may no longer restrict movement of the virtual object. In other words, the virtual reality computing device may be configured to move the virtual object based on user input without regard to movement constraints imposed by the object. Accordingly, if a user moves a virtual object toward an obstacle, and the user intends for the virtual object to pass through the obstacle, then this may be achieved if the user continues to provide a user input that violates the movement constraints of the obstacle. Such a user input may cause the input indicator to continue to move away from the collision indicator, until such time as the collision and input indicators are replaced by the virtual object based on the condition of separation, allowing the user to freely move the virtual object regardless of the presence of the obstacle.

In the event that a user stops providing user input after the virtual object is replaced by the collision and input indicators, then the virtual reality computing device may be configured to replace the input and collision indicators with the virtual object. In some implementations, the input indicator may move in a direction of the collision indicator any time the user is not providing user input in a different direction. Accordingly, upon the user discontinuing user input, the input indicator may move back to and rejoin with the collision indicator, causing the two indicators to be replaced by the virtual object. The virtual object may then move based on user input and movement constraints imposed by the obstacle. In this scenario, the condition of separation may be a distance between the collision and input indicators, and these indicators may be replaced by the virtual object based on the distance dropping below a threshold. Accordingly, if a user moves a virtual object such that it contacts an obstacle and is replaced by collision and input indicators, though the user does not desire for the virtual object to bypass the obstacle, then the user may discontinue user input that attempts to violate movement constraints of the obstacle. Notably, the input indicator may also move toward the collision indicator based on a user input that moves the input indicator away from the obstacle, and this may additionally result in the input and collision indicators being replaced by the virtual object.

In some implementations, a virtual object may replace input and collision indicators based on conditions of separation not described above. For example, the specific condition of separation that dictates when collision and input indicators are replaced may vary based on the type of virtual object, as well as the type of obstacle. The condition of separation may be a length of time after the virtual object is replaced by the indicators, and the indicators may be replaced by the virtual object after the length of time exceeds a threshold. Similarly, an input indicator and a collision indicator may be automatically replaced by a virtual object upon the two indicators reaching different sides of an obstacle. It will be appreciated that input and collision indicators may be replaced by a virtual object based on other conditions of separation not explicitly described herein.

After a virtual object is pushed through an obstacle, the virtual object may be partially or entirely occluded by the obstacle. This is schematically shown in FIG. 6B, in which virtual object 612 has replaced collision indicator 604 and input indicator 606 at a position of the input indicator. Given that the user and virtual object are on separate sides of the obstacle, in the event that obstacle 608 is non-transparent, then the virtual object may be difficult or impossible for the user to see. Accordingly, a virtual reality computing device may be configured to, based on an input indicator or a virtual object being occluded by an obstacle, display a virtual window to maintain visibility of the input indicator or the virtual object. This is shown in FIG. 6B, in which virtual window 614 allows user 600 to see virtual object 612 through obstacle 608. Similar virtual windows may be generated in the event that an input indicator is partially or completely occluded by an obstacle.

A virtual window as described herein may take a variety of forms. For example, in the event that an obstacle is a virtual object, then the virtual reality computing device may simply alter an appearance of the virtual object so as to increase its transparency. Alternatively, in the event that the obstacle is a real world object, then the virtual reality computing device may present a transparent or "ghost" image of the input indicator having a size and shape that makes it appear as though it is visible through the obstacle. Similarly, a virtual window may have a variety of suitable sizes and shapes so as to ensure that an input indicator or virtual object remains visible to a user.

Virtual imagery, such as virtual objects described above, may be generated and displayed in a variety of suitable ways. In some implementations, a near-eye display associated with a virtual reality computing device may include two or more microprojectors, each configured to project light on or within the near-eye display for the purpose of displaying virtual imagery to a user. FIG. 7A shows a portion of an example near-eye display 700. Near-eye display 700 includes a left microprojector 702L situated in front of a user's left eye 704L. It will be appreciated that near-eye display 700 also includes a right microprojector 702R situated in front of the user's right eye 704R, not visible in FIG. 7A.

The near-eye display includes a light source 706 and a liquid-crystal-on-silicon (LCOS) array 708. The light source may include an ensemble of light-emitting diodes (LEDs)—e.g., white LEDs or a distribution of red, green, and blue LEDs. The light source may be situated to direct its emission onto the LCOS array, which is configured to form a display image based on control signals received from a logic machine associated with a virtual reality computing device. The LCOS array may include numerous individually addressable pixels arranged on a rectangular grid or other geometry. In some embodiments, pixels reflecting red light may be juxtaposed in the array to pixels reflecting green and blue light, so that the LCOS array forms a color image. In other embodiments, a digital micromirror array may be used in lieu of the LCOS array, or an active-matrix LED array may be used instead. In still other embodiments, transmissive, backlit LCD or scanned-beam technology may be used to form the display image.

In some embodiments, the display image from LCOS array 708 may not be suitable for direct viewing by the user of near-eye display 700. In particular, the display image may be offset from the user's eye, may have an undesirable vergence, and/or a very small exit pupil (i.e., area of release of display light, not to be confused with the user's anatomical pupil). In view of these issues, the display image from the LCOS array may be further conditioned en route to the user's eye. For example, light from the LCOS array may pass through one or more lenses, such as lens 710, or other optical components of near-eye display 700, in order to reduce any offsets, adjust vergence, expand the exit pupil, etc.

Light projected by each microprojector 702 may take the form of a virtual image visible to a user, and occupy a particular screen-space position relative to the near-eye display. As shown, light from LCOS array 708 is forming virtual image 712 at screen-space position 714. Specifically, virtual image 712 is a virtual object taking the form of a banana, though any other virtual imagery may be displayed instead of and/or in addition to a virtual banana. A similar image may be formed by microprojector 702R, and occupy a similar screen-space position relative to the user's right eye. In some implementations, these two images may be offset from each other in such a way that they are interpreted by the user's visual cortex as a single, three-dimensional image. Accordingly, the user may perceive the images projected by the microprojectors as a single virtual object, occupying a three-dimensional world-space position that is behind the screen-space position at which the virtual image is presented by the near-eye display.

Figure 7B:
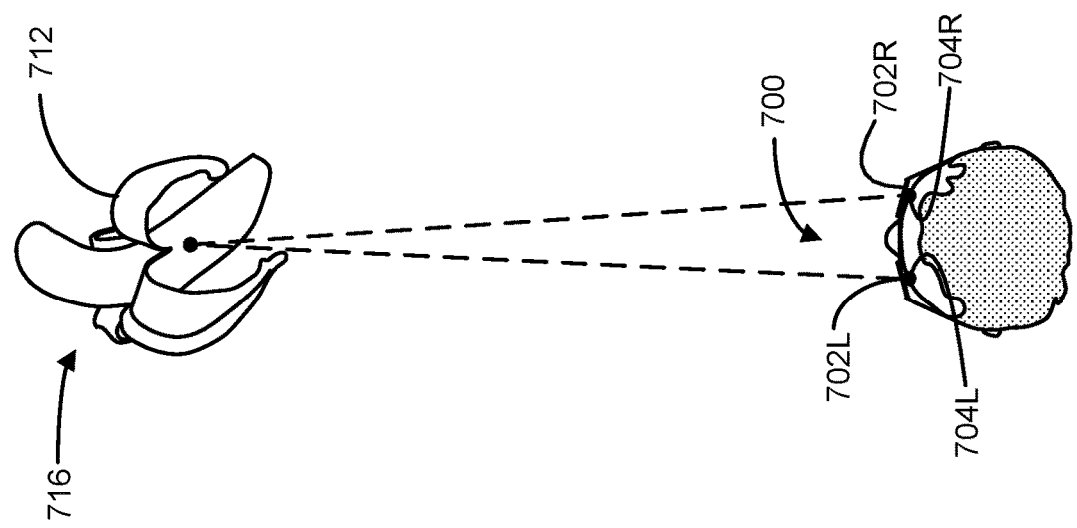
FIGS. 7A and 7B schematically illustrate presentation of virtual imagery to a user of a virtual reality computing device.
Figure 7A:
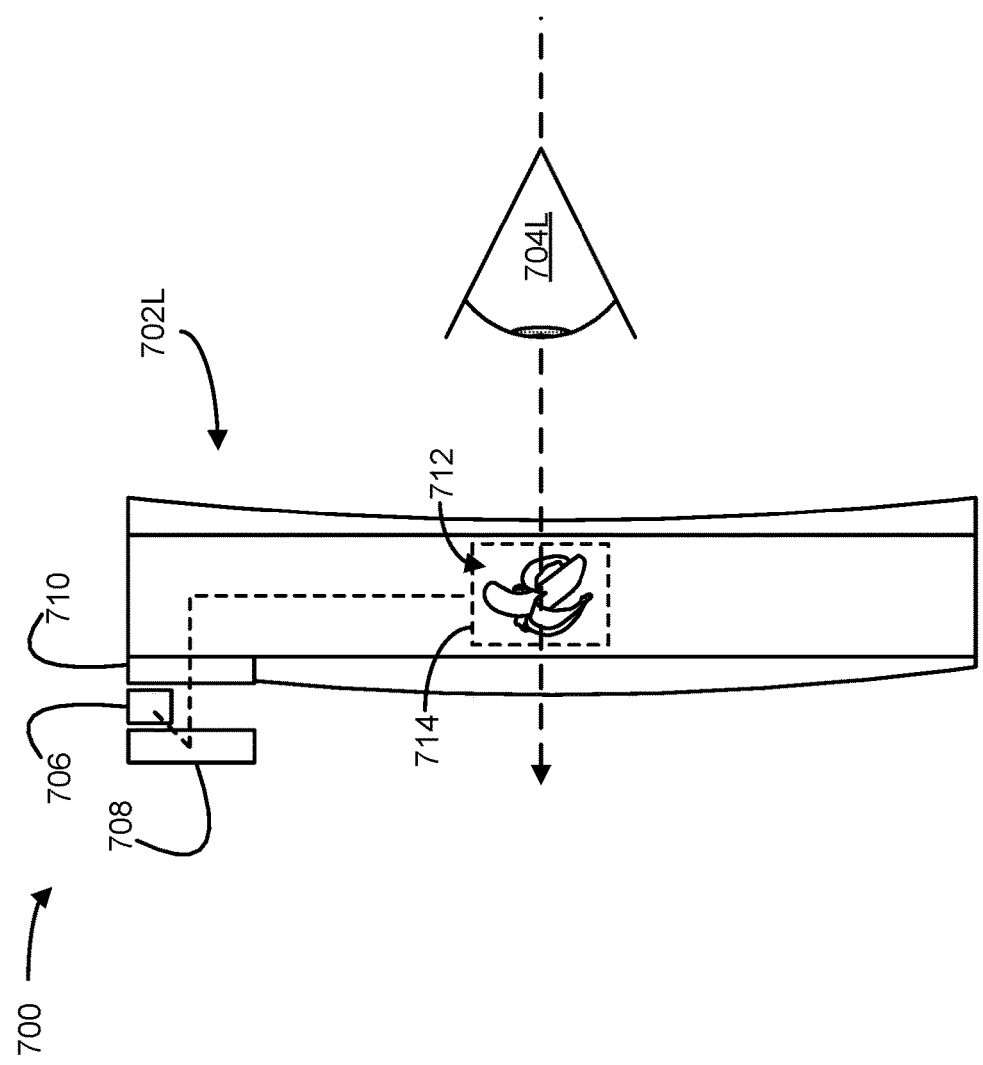

This is shown in FIG. 7B, which shows an overhead view of a user wearing near-eye display 700. As shown, left microprojector 702L is positioned in front of the user's left eye 704L, and right microprojector 702R is positioned in front of the user's right eye 704R. Virtual image 712 is visible to the user as a virtual object present at a three-dimensional world-space position 716. The user may provide user input to move the virtual object. Such user input may cause the screen-space position at which the virtual image is presented to change, giving the illusion that the virtual object is moving through three-dimensional space.

As with other figures shown above, FIG. 7B includes virtual imagery that would only be visible to the user of the virtual reality computing device.

Figure 8:
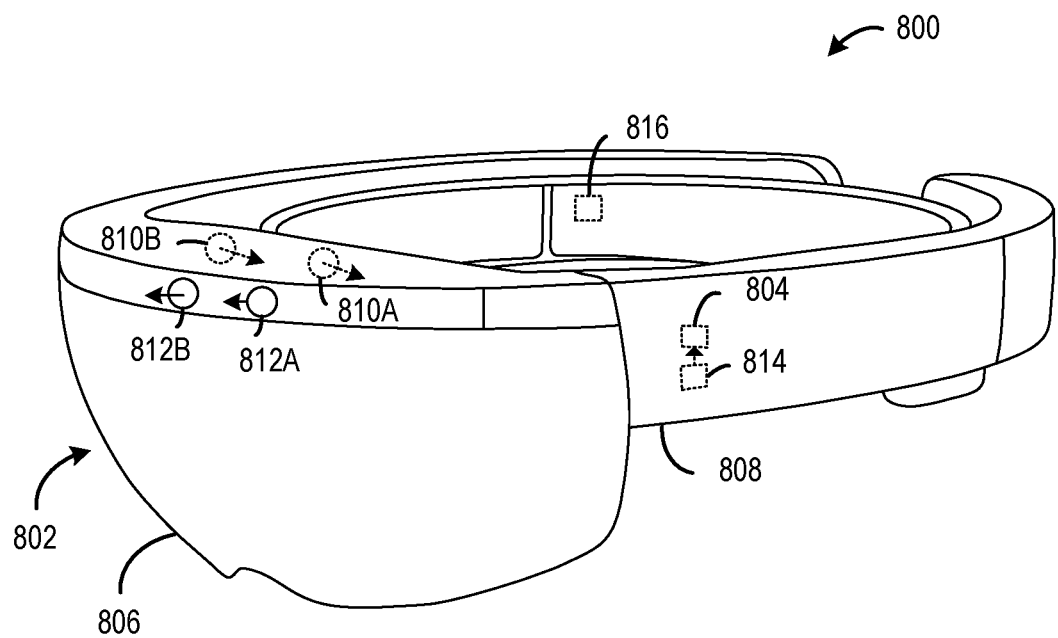
FIG. 8 schematically shows an example virtual reality computing device.

FIG. 8 shows aspects of an example virtual-reality computing system 800 including a near-eye display 802, which may present virtual imagery via one or more microprojectors as described above with respect to FIGS. 7A and 7B. The virtual-reality computing system 800 is a non-limiting example of the virtual-reality computing system 102 shown in FIGS. 1A and 1B, virtual reality computing devices shown in FIGS. 3A, 3B, 4, 4, 6A, 6B, a virtual reality device incorporating near-eye display 700 of FIG. 7, and/or the computing system 900 shown in FIG. 9.

The virtual-reality computing system 800 may be configured to present any suitable type of virtual-reality experience. In some implementations, the virtual-reality experience includes a totally virtual experience in which the near-eye display 802 is opaque, such that the wearer is completely absorbed in the virtual-reality imagery provided via the near-eye display 802.

In some implementations, the virtual-reality experience includes an augmented-reality experience in which the near-eye display 802 is wholly or partially transparent from the perspective of the wearer, to give the wearer a clear view of a surrounding physical space. In such a configuration, the near-eye display 802 is configured to direct display light to the user's eye(s) so that the user will see augmented-reality objects that are not actually present in the physical space. In other words, the near-eye display 802 may direct display light to the user's eye(s) while light from the physical space passes through the near-eye display 802 to the user's eye(s). As such, the user's eye(s) simultaneously receive light from the physical environment and display light.

In such augmented-reality implementations, the virtual-reality computing system 800 may be configured to visually present augmented-reality objects that appear body-locked and/or world-locked. A body-locked augmented-reality object may appear to move along with a perspective of the user as a pose (e.g., six degrees of freedom (DOF): x, y, z, yaw, pitch, roll) of the virtual-reality computing system 800 changes. As such, a body-locked, augmented-reality object may appear to occupy the same portion of the near-eye display 802 and may appear to be at the same distance from the user, even as the user moves in the physical space. Alternatively, a world-locked, augmented-reality object may appear to remain in a fixed location in the physical space, even as the pose of the virtual-reality computing system 800 changes. When the virtual-reality computing system 800 visually presents world-locked, augmented-reality objects, such a virtual-reality experience may be referred to as a mixed-reality experience.

In some implementations, the opacity of the near-eye display 802 is controllable dynamically via a dimming filter. A substantially see-through display, accordingly, may be switched to full opacity for a fully immersive virtual-reality experience.

The virtual-reality computing system 800 may take any other suitable form in which a transparent, semi-transparent, and/or non-transparent display is supported in front of a viewer's eye(s). Further, implementations described herein may be used with any other suitable computing device, including but not limited to wearable computing devices, mobile computing devices, laptop computers, desktop computers, smart phones, tablet computers, etc.

Any suitable mechanism may be used to display images via the near-eye display 802. For example, the near-eye display 802 may include image-producing elements located within lenses 806. As another example, the near-eye display 802 may include a display device, such as a liquid crystal on silicon (LCOS) device or OLED microdisplay located within a frame 808. In this example, the lenses 806 may serve as, or otherwise include, a light guide for delivering light from the display device to the eyes of a wearer. Additionally or alternatively, the near-eye display 802 may present left-eye and right-eye virtual-reality images via respective left-eye and right-eye displays.

The virtual-reality computing system 800 includes an on-board computer 804 configured to perform various operations related to receiving user input (e.g., gesture recognition, eye gaze detection), visual presentation of virtual-reality images on the near-eye display 802, and other operations described herein. In some implementations, some to all of the computing functions described above, may be performed off board.

The virtual-reality computing system 800 may include various sensors and related systems to provide information to the on-board computer 804. Such sensors may include, but are not limited to, one or more inward facing image sensors 810A and 810B, one or more outward facing image sensors 812A and 812B, an inertial measurement unit (IMU) 814, and one or more microphones 816. The one or more inward facing image sensors 810A, 810B may be configured to acquire gaze tracking information from a wearer's eyes (e.g., sensor 810A may acquire image data for one of the wearer's eye and sensor 810B may acquire image data for the other of the wearer's eye).

The on-board computer 804 may be configured to determine gaze directions of each of a wearer's eyes in any suitable manner based on the information received from the image sensors 810A, 810B. The one or more inward facing image sensors 810A, 810B, and the on-board computer 804 may collectively represent a gaze detection machine configured to determine a wearer's gaze target on the near-eye display 802. In other implementations, a different type of gaze detector/sensor may be employed to measure one or more gaze parameters of the user's eyes. Examples of gaze parameters measured by one or more gaze sensors that may be used by the on-board computer 804 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes.

The one or more outward facing image sensors 812A, 812B may be configured to measure physical environment attributes of a physical space. In one example, image sensor 812A may include a visible-light camera configured to collect a visible-light image of a physical space. Further, the image sensor 812B may include a depth camera configured to collect a depth image of a physical space. More particularly, in one example, the depth camera is an infrared time-of-flight depth camera. In another example, the depth camera is an infrared structured light depth camera.

Data from the outward facing image sensors 812A, 812B may be used by the on-board computer 804 to detect movements, such as gesture-based inputs or other movements performed by a wearer or by a person or physical object in the physical space. In one example, data from the outward facing image sensors 812A, 812B may be used to detect a user input performed by the wearer of the virtual-reality computing system 800, such as a gesture. Data from the outward facing image sensors 812A, 812B may be used by the on-board computer 804 to determine direction/location and orientation data (e.g., from imaging environmental features) that enables position/motion tracking of the virtual-reality computing system 800 in the real-world environment. In some implementations, data from the outward facing image sensors 812A, 812B may be used by the on-board computer 804 to construct still images and/or video images of the surrounding environment from the perspective of the virtual-reality computing system 800.

The IMU 814 may be configured to provide position and/or orientation data of the virtual-reality computing system 800 to the on-board computer 804. In one implementation, the IMU 814 may be configured as a three-axis or three-degree of freedom (3DOF) position sensor system. This example position sensor system may, for example, include three gyroscopes to indicate or measure a change in orientation of the virtual-reality computing system 800 within 3D space about three orthogonal axes (e.g., roll, pitch, and yaw).

In another example, the IMU 814 may be configured as a six-axis or six-degree of freedom (6DOF) position sensor system. Such a configuration may include three accelerometers and three gyroscopes to indicate or measure a change in location of the virtual-reality computing system 800 along three orthogonal spatial axes (e.g., x, y, and z) and a change in device orientation about three orthogonal rotation axes (e.g., yaw, pitch, and roll). In some implementations, position and orientation data from the outward facing image sensors 812A, 812B and the IMU 814 may be used in conjunction to determine a position and orientation (or 6DOF pose) of the virtual-reality computing system 800.

The virtual-reality computing system 800 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 816 may be configured to measure sound in the physical space. Data from the one or more microphones 816 may be used by the on-board computer 804 to recognize voice commands provided by the wearer to control the virtual-reality computing system 800.

The on-board computer 804 may include a logic machine and a storage machine, discussed in more detail below with respect to FIG. 9, in communication with the near-eye display 802 and the various sensors of the virtual-reality computing system 800.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
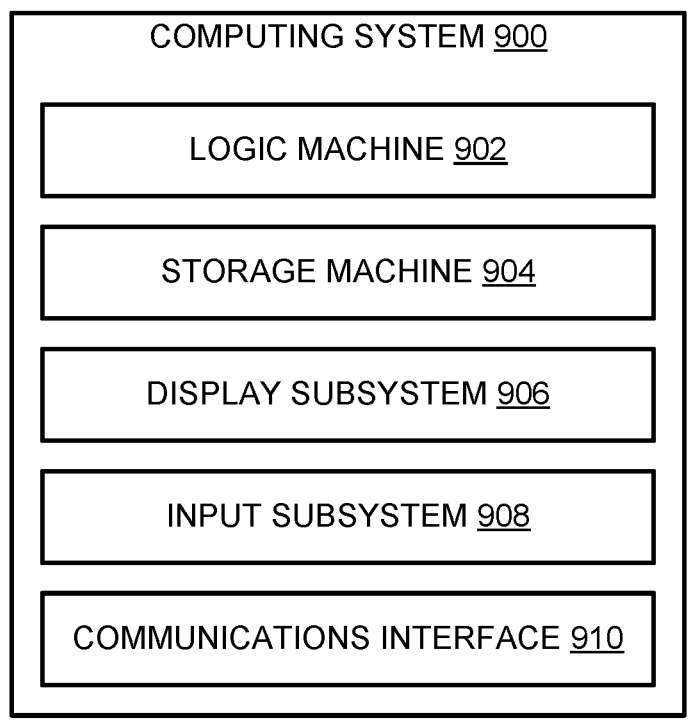
FIG. 9 schematically shows an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), virtual reality computing devices, and/or other computing devices.

Computing system 900 includes a logic machine 902 and a storage machine 904. Computing system 900 may optionally include a display subsystem 906 input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In an example, a method for moving a virtual object comprises: displaying a virtual object; moving the virtual object based on a user input; based on the user input attempting to move the virtual object in violation of an obstacle, displaying a collision indicator and an input indicator; moving the collision indicator based on user input and movement constraints imposed by the obstacle; and moving the input indicator based on user input without movement constraints imposed by the obstacle. In this example or any other example, the obstacle is a real world object. In this example or any other example, the obstacle is a virtual object. In this example or any other example, an appearance of the collision indicator mimics an appearance of the virtual object. In this example or any other example, an appearance of the input indicator is different than but derived from an appearance of the virtual object. In this example or any other example, the collision indicator and input indicator differ in appearance according to one or more of color, size, and transparency. In this example or any other example, a difference in appearance between the collision indicator and input indicator changes based on a distance between the collision indicator and the input indicator. In this example or any other example, rotation of the input indicator results in collision-permissible rotation of the collision indicator. In this example or any other example, movement of the collision indicator is further based on a simulated attractive force that pulls the collision indicator toward the input indicator. In this example or any other example, movement constraints imposed by the obstacle are relaxed as a distance between the collision indicator and the input indicator increases. In this example or any other example, the collision indicator and input indicator replace the virtual object. In this example or any other example, the method further comprises replacing the collision indicator and the input indicator with the virtual object at a position of the input indicator based on a condition of separation between the collision indicator and the input indicator. In this example or any other example, the condition of separation is a distance between the collision indicator and the input indicator, and the collision indicator and the input indicator are replaced with the virtual object at the position of the input indicator based on the distance exceeding a threshold. In this example or any other example, upon replacing the collision indicator and the input indicator with the virtual object, the method further comprises moving the virtual object based on user input without movement constraints imposed by the obstacle. In this example or any other example, the method further comprises displaying a virtual window to maintain visibility of the input indicator or the virtual object.

In an example, a computing device comprises: a logic machine; and a storage machine holding instructions executable by the logic machine to: display a virtual object; move the virtual object based on a user input; and based on the user input attempting to move the virtual object in violation of an obstacle, replace the virtual object with a collision indicator and an input indicator; move the collision indicator based on user input and movement constraints imposed by the obstacle; and move the input indicator based on user input without movement constraints imposed by the obstacle. In this example or any other example, the collision indicator and input indicator differ in appearance according to one or more of color, size, and transparency, and a difference in appearance between the collision indicator and input indicator changes based on a distance between the collision indicator and input indicator. In this example or any other example, the instructions are further executable to replace the collision indicator and the input indicator with the virtual object at a position of the input indicator based on a distance between the collision indicator and the input indicator exceeding a threshold, and move the virtual object based on user input without movement constraints imposed by the obstacle. In this example or any other example, movement of the collision indicator is further based on a simulated attractive force that pulls the collision indicator toward the input indicator.

In an example, a method for moving a virtual object comprises: displaying a virtual object; moving the virtual object based on a user input; and based on the user input attempting to move the virtual object in violation of an obstacle, replacing the virtual object with a collision indicator and an input indicator; moving the collision indicator based on user input, movement constraints imposed by the obstacle, and a simulated attractive force that pulls the collision indicator toward the input indicator; moving the input indicator based on user input without movement constraints imposed by the obstacle; based on a distance between the collision indicator and the input indicator exceeding a threshold, replacing the collision indicator and the input indicator with the virtual object at a position of the input indicator; and moving the virtual object from the position based on user input without movement constraints imposed by the obstacle.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for moving a virtual object on a computing device, comprising:
   displaying a virtual object;
   moving the virtual object based on a user input;
   based on the user input attempting to move the virtual object in violation of an obstacle, displaying a collision indicator and an input indicator, where a shape of the input indicator is derived from a shape of the virtual object;
   moving the collision indicator based on user input and movement constraints imposed by the obstacle; and
   moving the input indicator based on user input without movement constraints imposed by the obstacle.

2. The method of claim 1, where the collision indicator has a same size and shape as the virtual object.

3. The method of claim 1, where an appearance of the collision indicator is different than but derived from the appearance of the virtual object.

4. The method of claim 1, where an appearance of the input indicator differs from an appearance of the collision indicator according to one or more of color, size, and transparency.

5. The method of claim 4, where a difference in appearance between the collision indicator and the input indicator changes based on a distance between the collision indicator and the input indicator.

6. The method of claim 5, where one or both of a color and a transparency of the input indicator changes based on a distance between the input indicator and the collision indicator.

7. The method of claim 1, where the obstacle is a real-world object.

8. The method of claim 1, where rotation of the input indicator results in collision-permissible rotation of the collision indicator.

9. The method of claim 1, where movement of the collision indicator is further based on a simulated attractive force that pulls the collision indicator toward the input indicator.

10. The method of claim 1, where movement constraints imposed by the obstacle are relaxed as a distance between the collision indicator and the input indicator increases.

11. The method of claim 1, where the collision indicator and input indicator replace the virtual object.

12. The method of claim 11, further comprising replacing the collision indicator and the input indicator with the virtual object at a position of the input indicator based on a condition of separation between the collision indicator and the input indicator.

13. The method of claim 12, where the condition of separation is a distance between the collision indicator and the input indicator, and the collision indicator and the input indicator are replaced with the virtual object at the position of the input indicator based on the distance exceeding a threshold.

14. The method of claim 12, where upon replacing the collision indicator and the input indicator with the virtual object, the method further comprises moving the virtual object based on user input without movement constraints imposed by the obstacle.

15. The method of claim 1, further comprising displaying a virtual window to maintain visibility of the input indicator or the virtual object.

16. A computing device, comprising:
   a logic machine; and
   a storage machine holding instructions executable by the logic machine to:
      display a virtual object;
      move the virtual object based on a user input; and
      based on the user input attempting to move the virtual object in violation of an obstacle, replace the virtual object with a collision indicator and an input indicator, where an appearance of the collision indicator mimics an appearance of the virtual object, a shape of the input indicator is derived from a shape of the virtual object, and an appearance of the input indicator changes based on a distance between the input indicator and the collision indicator;
      move the collision indicator based on user input and movement constraints imposed by the obstacle; and
      move the input indicator based on user input without movement constraints imposed by the obstacle.

17. The computing device of claim 16, where the collision indicator and input indicator differ in appearance according to one or more of color, size, and transparency.

18. The computing device of claim 16, where the instructions are further executable to replace the collision indicator and the input indicator with the virtual object at a position of the input indicator based on a distance between the collision indicator and the input indicator exceeding a threshold, and move the virtual object based on user input without movement constraints imposed by the obstacle.

19. The computing device of claim 18, where movement of the collision indicator is further based on a simulated attractive force that pulls the collision indicator toward the input indicator.

20. A method for moving a virtual object on a computing device, comprising:
   displaying a virtual object;
   moving the virtual object based on a user input; and
   based on the user input attempting to move the virtual object in violation of an obstacle, replacing the virtual object with a collision indicator and an input indicator, where an appearance of the input indicator changes based on a distance between the input indicator and the collision indicator, and where a shape of the input indicator is derived from a shape of the virtual object;
   moving the collision indicator based on user input, movement constraints imposed by the obstacle, and a simulated attractive force that pulls the collision indicator toward the input indicator;
   moving the input indicator based on user input without movement constraints imposed by the obstacle;
   based on a distance between the collision indicator and the input indicator exceeding a threshold, replacing the collision indicator and the input indicator with the virtual object at a position of the input indicator; and
   moving the virtual object from the position based on user input without movement constraints imposed by the obstacle.

\* \* \* \* \*